(12) United States Patent
Mraz et al.

(10) Patent No.: US 9,207,060 B2
(45) Date of Patent: Dec. 8, 2015

(54) MICRO-ELECTRICAL DISCHARGED BASED METROLOGY SYSTEM (76) Inventors: Jerry Mraz, Lisle, IL (US); Jonathan Montgomery, Naperville, IL (US)

( * ) Notice: Subject to any disclaimer, the term of this patent is extended or adjusted under 35 U.S.C. 154(b) by 280 days.

(21) Appl. No.: 14/114,894

(22) PCT Filed: May 2, 2012

(86) PCT No.: PCT/US2012/036168
§ 371 (c)(1),
(2), (4) Date: Oct. 30, 2013

(87) PCT Pub. No.: WO2012/151308
PCT Pub. Date: Nov. 8, 2012

(65) Prior Publication Data
US 2014/0130619 A1  May 15, 2014

Related U.S. Application Data (60) Provisional application No. 61/482,120, filed on May 3, 2011.

(51) Int. Cl.
*G01B 7/34* (2006.01)
*G01B 7/008* (2006.01)
(Continued)

(52) U.S. Cl.
CPC ................ *G01B 7/008* (2013.01); *B23H 11/00* (2013.01); *G01B 7/023* (2013.01); *G01B 7/28* (2013.01); *B23H 1/024* (2013.01); *B23H 7/18* (2013.01); *G01B 7/34* (2013.01)

(58) Field of Classification Search
CPC ....... G01B 7/34; G01N 21/67; G01R 31/2831
See application file for complete search history.

(56) References Cited

U.S. PATENT DOCUMENTS 4,665,739 A * 5/1987 Mizuno ................... G01B 7/34
  73/105
4,765,181 A * 8/1988 Numoto ................... G01B 5/28
  73/105

(Continued)

FOREIGN PATENT DOCUMENTS

GB  2312957  11/1997
JP  50-099759 A  8/1975

(Continued)

OTHER PUBLICATIONS

International Searching Authority, "Notification of Transmittal of the International Search Report and the Written Opinion of the International Searching Authority, or the Declaration," Nov. 20, 2012.

(Continued)

*Primary Examiner* — David A Rogers
(74) *Attorney, Agent, or Firm* — Kinne IP Group, P.C.; Charles C. Kinne; Mary E. Adams (57) ABSTRACT

A micro-electrical discharge machine based metrology system including a control unit with a sensing circuit and a micro-electrical discharge machine with a sensing probe. The micro-electrical discharge machine based metrology system capable of sensing dimensions of a work piece at pico-joule energy levels. The micro-electrical discharge machine based metrology system is a non-contact, non-destructive, and on-board metrology system capable of in-process quality assurance/quality control.

20 Claims, 7 Drawing Sheets

(51) Int. Cl.
  *B23H 11/00*  (2006.01)
  *G01B 7/02*  (2006.01)
  *G01B 7/28*  (2006.01)
  *B23H 1/02*  (2006.01)
  *B23H 7/18*  (2006.01)

(56) References Cited

U.S. PATENT DOCUMENTS

| | | | | |
|---|---|---|---|---|
| 5,270,664 A * | 12/1993 | McMurtry | ............. | G01B 7/023 |
| | | | | 324/662 |
| 5,798,529 A * | 8/1998 | Wagner | ................. | G01B 15/00 |
| | | | | 250/492.21 |
| 5,951,884 A * | 9/1999 | Futamura | ................. | B23H 7/30 |
| | | | | 219/69.17 |
| 6,230,070 B1 * | 5/2001 | Yodoshi | ................. | B23Q 1/267 |
| | | | | 700/162 |
| 6,448,529 B1 * | 9/2002 | Hiraishi | ................. | B23H 1/024 |
| | | | | 219/69.16 |
| 7,578,853 B2 * | 8/2009 | Hattori | ................. | B82Y 35/00 |
| | | | | 250/306 |
| 2003/0052462 A1 | 3/2003 | Komine | | |
| 2006/0081040 A1 * | 4/2006 | Yamamoto | ............. | B82Y 35/00 |
| | | | | 73/105 |
| 2006/0267622 A1 * | 11/2006 | Lagowski | ............ | G01R 31/312 |
| | | | | 324/754.21 |
| 2007/0221844 A1 * | 9/2007 | Yamanashi | ........ | G01N 23/2258 |
| | | | | 250/309 |
| 2008/0205593 A1 * | 8/2008 | Yellepeddi | ............. | G01N 21/67 |
| | | | | 378/46 |
| 2010/0163427 A1 | 7/2010 | Zhan | | |
| 2012/0176146 A1 * | 7/2012 | Oborina | ............... | G01R 31/311 |
| | | | | 324/658 |

FOREIGN PATENT DOCUMENTS

| | | |
|---|---|---|
| JP | 60-099537 A | 6/1985 |
| JP | 2004-243426 A | 9/2004 |
| JP | 2009-229427 A | 10/2009 |

OTHER PUBLICATIONS

International Searching Authority, "Supplementary European Search Report" Dec. 14, 2014.

* cited by examiner

Flat Probe and Results (600X)

FIG. 5.1

Rounded Probe and Results (3000X)

The standard distribution of a single point

FIG. 6B

A Carbide Nozzle
FIG. 7(A)

Cut-away of its mapped form
FIG. 7(B)

MICRO-ELECTRICAL DISCHARGED BASED METROLOGY SYSTEM

CROSS-REFERENCE TO RELATED APPLICATIONS

This application relates to and claims priority from U.S. Provisional Patent Application Ser. No. 61/482,120, filed May 3, 2011, and PCT Patent Application No. PCT/US2012/036168 filed May 2, 2012.

BACKGROUND OF THE INVENTION

1. Field of the Invention

This invention is directed to a micro-electrical discharge machine (μEDM) based metrology system using a styli and sensing at pica joule energy levels. The micro-electrical discharge machine based metrology system is a non-contact, non-destructive, and on-board metrology system capable of in-process quality assurance/quality control (QA/QC).

2. Discussion of Related Art

Many industries, including semiconductor, medical, automotive, defense and aerospace have an increasing need for parts with dimensions measured in microns, commonly known as microstructures. However, known methods for measuring these microstructures have various short-comings which often result in the need to scrap parts which are manufactured out of specification.

When a conventionally-sized part is manufactured, the part can be removed from the machining platform and measured. If a dimension is found to be out of tolerance, the part can be placed back onto the machining platform for additional work. However, as machined parts are reduced in size to microns with even smaller tolerances, it is impractical for these parts to be re-positioned on the machine after measuring with the necessary accuracy. Accordingly, in order to maintain reference points on the machined part, the part must be measured on the machining platform prior to removal. If a part is removed from the machine to be measured and found to be out of specification, the part must be scrapped as it is very difficult to reposition in the machine with the accuracy necessary for additional machining. The machining process must then be modified and a new part fabricated. This costs time, money, and results in material waste.

Known on-machine metrology devices can cut this drop-out rate by 90%, resulting in substantial savings to the manufacturer, supplier, and consumer. However, these known metrology platforms are expensive, have fragile sensors and have a limited scope of measurement.

Known on-machine micro-metrology systems are generally divided into two types, tactile or optical systems. Optical systems, either visible or laser, are limited by line-of-sight restrictions (if it can't see it, it can't measure it). While tactile based systems have delicate sensors with limited ranges with respect to aspect ratios, sidewalls, and overhangs. Tactile sensors also rely on surface contact with the part, surface contact can leave witness marks, scratches or blemishes that can render a part unusable for an intended purpose. As an example, one type of ultra-high precision probe will contact a surface with 0.300 Nm/μm of force. This force is 15 billion times greater than the smallest force from the sensor of this invention.

Both tactile and optical systems are also adversely affected by machine oils and other machining residues. For either of these systems to be effective, additional cleaning steps are necessary both inside and outside of the machining platform prior to use.

As such, there is a need for an improved metrology system for measuring micro-sized components that avoids the shortcomings of known metrology systems.

SUMMARY OF THE INVENTION

A general object of the invention is to provide a metrology system that uses electrical discharge sensing to measure a component's size.

Electrical discharge machining (EDM) is currently a purely material erosion manufacturing process whereby electric sparks are used to erode material from a work piece to form a desired shape. A tool-electrode and a work piece-electrode are subjected to an electric voltage and in a dielectric. Initially, as the tool-electrode approaches the work piece-electrode the dielectric acts as an insulator. As the tool-electrode moves closer to the work piece an electric field breaks down the dielectric, forming a plasma bubble between the tool-electrode and the work piece-electrode. The plasma bubble conducts a flow of energy, a spark, between the work piece-electrode to the tool-electrode, evaporating material from the work piece and a smaller amount of material from the tool. This flow of energy depletes the charge stored in the system, and equalizes an electric potential between the tool-electrode and work piece-electrode, collapsing the electric field and ending the spark event. Particles of evaporated material cool and are flushed away with the dielectric fluid. With the electrical flow broken, the capacitor recharges and the electric field is reestablished. Table 1 lists the traditional energy levels used by conventional EDM and μEDM systems. It is traditionally held that EDM circuits will not function with a bias of less than 60 volts.

TABLE 1

| Voltage (V) | Capacitance (pF) | Energy (nJ) |
|---|---|---|
| Conventional EDM energy | | 320,000,000 |
| 100 | 3300 | 16,500 |
| 80 | 100 | 320 |
| 60 | 10 | 18 |

Instead of the conventional focus of an EDM described above, the metrology machine of the present invention uses a lower energy level so as to not remove any material from the surface of the work piece.

In a preferred embodiment, the micro-electrical discharge based metrology system for non-contact, non-destructive, on-board metrology includes a pica joule energy level μEDM sensing circuit and a reliable spindle probe sensor that is electrically isolated and mountable in a variety of conventional EDM machines. Sensing with these energy levels using a μEDM formed styli is a reversal of the process behind EDM. Such minute energy levels, combined with high frequency response electronics, will create a non-destructive, non-contact electrical sensor for in situ metrology. The system of this invention will not only have the ability for micro-metrology, but will have the added benefit of a μEDM's innate capability to self-manufacture its own probe sensors, as well as the standard μEDM functionality for manufacturing micro-holes, contoured forming, and de-burring of conductive materials.

In a preferred embodiment, the micro-electrical discharge based metrology system of this invention includes a tank to hold a work piece, preferably in a dielectric fluid. Preferably, the tank includes a support surface and a mechanism to reposition the work piece in at least two dimensions and preferably three dimensions. The work piece preferably comprises a conductive material, for example, but not limited to, metallic materials including stainless steel, platinum, titanium, gold and molybdenum. However, the work piece need not be a metallic material and may comprise any conductive material including, but not limited to, ceramic materials, doped silicon, impregnated ceramics, and thin-film covered, non-conductive materials.

The micro-electrical discharge based metrology system of this invention further includes a probe with a mechanism for positing the probe in proximity to the work piece. The mechanism is preferably a computer numerical control (cnc) machine that is capable of moving the probe in at least two dimensions and preferably in three dimensions. The probe preferably comprises one of a traditional coordinate measuring machine (CMM) stylus, a cylindrical stylus, an ultra-smooth stylus, a rectangular stylus, a wheel or disk stylus, and a tapered stylus. However, this invention is not limited to the listed styli and may be any type of stylus known to a person of skill in the art.

The micro-electrical discharge based metrology system of this invention further includes a control unit with a sensing circuit (also known as a discharge circuit) and a controller for the cnc machine. The sensing circuit is electrically connected to the probe and the work piece. The sensing circuit preferably comprises a resistor-capacitor (RC) circuit that runs on a natural frequency of the chosen component values. Alternatively, the sensing circuit may comprise a pulsed direct current (DC) generator with a frequency selected by a waveform generator.

In operation, the cnc machine moves the probe in proximity to the work piece, as a gap between the work piece and the probe becomes sufficiently small a dielectric breakdown occurs and a position of at least one of the probe and the work piece is recorded, preferably on a recordable medium in the control unit and/or the cnc machine. The cnc machine then moves the probe to another position in proximity to the work piece to record another position. This process is repeated until the work piece is dimensioned, as needed. In a preferred embodiment, a spark energy resulting from the dielectric breakdown does not cause damage to a surface of the work piece. In an embodiment, the spark energy resulting from the dielectric breakdown is less than 2.0 nanojoules (nJ). In another embodiment, the spark energy resulting from the dielectric breakdown is less than 0.500 nanojoules. In another embodiment, the spark energy resulting from the dielectric breakdown is less than 0.020 nanojoules.

In another preferred embodiment of this invention, the micro-electrical discharge machine for non-contact measuring of this invention is a stand-alone machine that includes an isolated probe system, a stand-alone control box, a control cable and coded instructions to interface with a third-party micro electrical discharge machine and/or a third-party cnc machine. In another embodiment, the micro-electrical discharge machine can be retrofit onto existing μEDM as well as licensed and distributed with new μEDM platforms.

BRIEF DESCRIPTION OF THE DRAWINGS

These and other objects and features of this invention will be better understood from the following detailed description taken in conjunction with the drawings, wherein:

FIGS. 4.1 to 4.7 show various alternative probes that may be used with the micro-electrical discharge based metrology system of FIG. 1;

FIGS. 5.1 and 5.2 show a pair of probes that may be used with the micro-electrical discharge based metrology system of FIG. 1 and surface deformations resulting from each probe;

DESCRIPTION OF PREFERRED EMBODIMENTS

Figure 1:
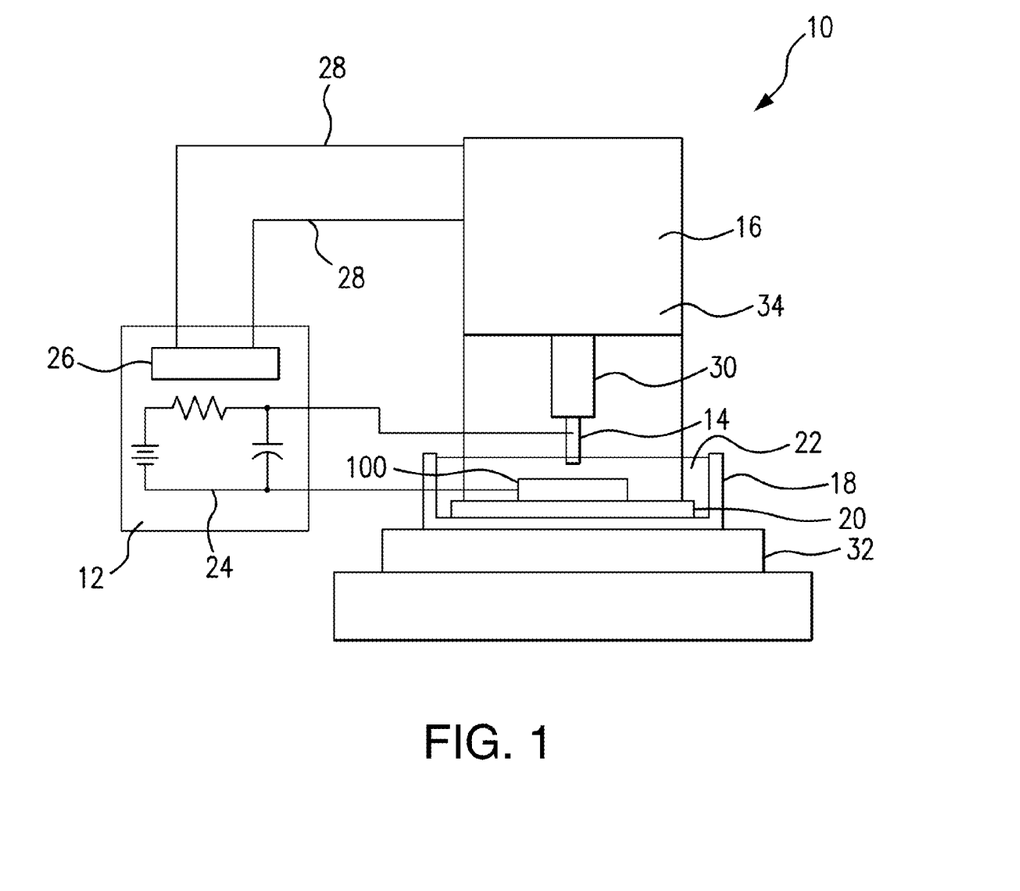
FIG. 1 is a schematic drawing of a micro-electrical discharge based metrology system according to one embodiment of this invention.

FIG. 1 is a schematic diagram showing a preferred embodiment of a micro-electrical discharge (μEDM) based metrology system 10 of this invention. The μEDM-based metrology system 10 provides a non-contact, non-destructive, on-board metrology system. The μEDM-based metrology system 10 of this embodiment includes a control unit 12 for operating the μEDM-based metrology system 10, a spindle probe 14, a micro-electrical discharge machine 16 and a tank 18 with a work surface 20 and filled with a dielectric fluid 22.

Figure 2:
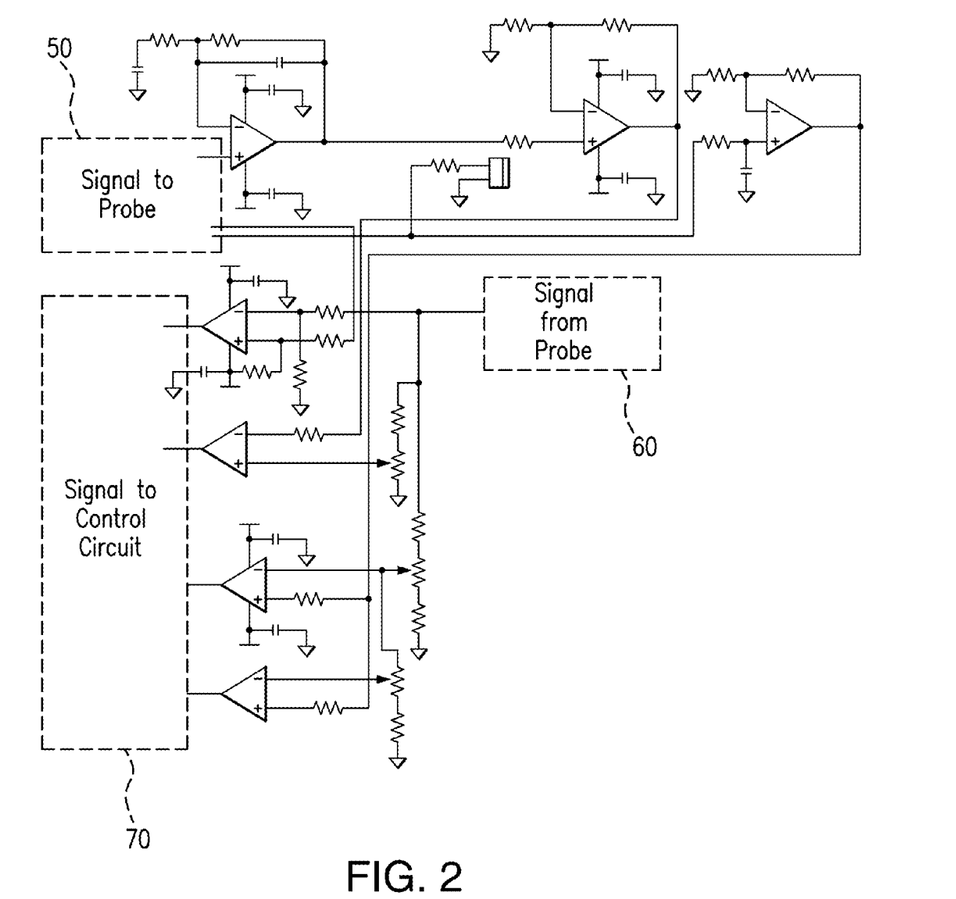
FIG. 2 shows a sensing circuit according to a preferred embodiment of this invention.

In a preferred embodiment, the control unit 12 includes a sensing circuit 24 (also known as a discharge circuit) that is electrically connected to the spindle probe 14 and a work piece 100. In a preferred embodiment, the sensing circuit 24 comprises a resistor-capacitor (RC) circuit that runs on a natural frequency of the chosen component values. FIG. 2 shows a detailed circuit layout for a preferred embodiment of the sensing circuit 24 of this invention. The circuit of FIG. 2 includes connection to probe 50, connection from probe 60 and connections to a control circuit 70. In an alternative embodiment, the sensing circuit 24 may comprise a pulsed direct current (DC) generator with a frequency selected by a waveform generator.

In a preferred embodiment, the sensing circuit 24 is designed to operate at pico-Joule energy levels, such as 5-20 volts and 10 pF, to prevent damaging the work piece 100. However, the sensing circuit 24 can be designed to operate at any energy level that provides non-destructive metrology.

In the embodiment of FIG. 1, the control unit 12 further includes a controller 26 for providing instructions to the μEDM 16. The controller 26 is connected to the μEDM 16 via a control cable 28. In a preferred embodiment, the controller 26 includes coded instructions (software and/or hardware) to provide a user-independent, closed-loop, metrology system. Where the coded instructions may comprises a recordable medium in combination with a data processor. The control unit 12 is preferably platform-independent, capable of providing the necessary input/output (I/O) to communicate motion and detection on various third-party machining platforms. This will allow for the μEDM-based metrology system 10 be mounted on third-party platforms, working as on-board micro-metrology system in addition to the machining aspects of the third-party platform. The μEDM-based metrology system 10 is preferably capable of working directly with third-party platforms as a self-adaptive micro-machining platform. In the embodiment of FIG. 1, the control unit 12 is shown as a separate component. However, in an alternative embodiment, the control unit 12 can be manufactured as a component or a feature of the μEDM 16.

In the embodiment of FIG. 1, the μEDM 16 includes a mechanism 34 for positioning the spindle probe 14 and a receiver 30 for connecting the spindle probe 14 to the μEDM 16. In a preferred embodiment, the mechanism for positioning the spindle probe 14 is a computer numerical controlled (cnc) machine that is capable of moving the probe 14 in at least two dimensions and preferably in three dimensions. In a preferred embodiment of this invention, the mechanism 34 for controlling the position of probe 14 is controllable from the control unit 12.

Preferably, the receiver 30 is a double V-groove mandrel holder that allows the probe 14 to be removed from the μEDM 16 and later returned for additional measuring with little necessary positional calibration. The double V-groove mandrel holder maintains positional accuracy to less than 0.250 microns between mandrels. Allowing micro-manufactured parts to be measured in situ, and verified prior to removing the micro-manufactured parts from the machining platform. In an alternative embodiment, the receiver 30 may comprise another means for connecting the probe 14 to the μEDM 16 including, for example but not limited to, a spindle/collet system and a chucked spindle probe.

When attaching the spindle probe 14 to the receiver 30, the probe is preferably calibrated. In a preferred embodiment, the spindle probe 14 of this invention is calibrated using a testing process for CMM calibration, for example, ASME B89.4.1, VDI/VDE 217 and ISO 10360. The testing process for CMM calibration preferably includes 21 tests of various standards including: linear accuracy for each axis (X, Y, Z); squareness of axes to each other (XY, XZ, YZ); horizontal and vertical straightness of each axis (X, Y, Z); and rotational accuracy of each axis (pitch, roll, and yaw of each axis). Each test involves collecting data by measuring a series of gauges as defined, and many times calibrated and provided, by the National Institute of Standards and Technology.

Figure 3:
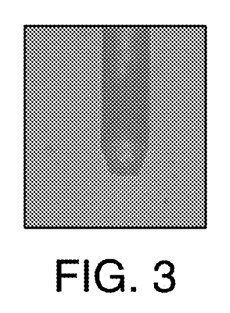
FIG. 3 shows a preferred embodiment of a probe that may be used with the micro-electrical discharge based metrology system of FIG. 1.

The spindle probe 14 can have various shapes and sizes depending on the shape and material of the component that is to be measured. Wire Electro-Discharge Grinding (WEDG) is a process for tool formation that allows for the creation of tools with various shapes and sizes. The probe 14 is preferably machined with the WEDG process to an optimal shape for individual part measurement. FIG. 3 shows a preferred embodiment of the probe 14 of this invention comprising a cylindrical probe with a rounded conical tip. FIGS. 4.1-4.7 show seven alternative embodiments of probes that may be used with the μEDM-based metrology system 10 of this invention. FIG. 4.1 is a probe for high aspect ratio forms. FIG. 4.2 is a traditional CMM stylus. FIG. 4.3 is a disk or wheel probe used to measure a variety of features including, but not limited to, side-walls, reverse tapers and threads. FIG. 4.4 is a general cylindrical stylus. FIG. 4.5 is an ultra-smooth (10 nm Ra) 70 micron styli in the CMM style. FIG. 4.6 is a rectangular stylus for measuring inside corner radii. FIG. 4.7 is a specialized tool for measuring the bottom radii within V-channels and tapered holes. However, it should be understood that the probe 14 is not limited to the shapes of FIGS. 2 and 3.1-3.7 and can have any shape necessary for measuring a component with this invention.

As shown in FIG. 1, the μEDM 16 further includes the tank 18 with the work surface 20. In a preferred embodiment, the tank 18 is filled with a dielectric fluid 22 however, the tank does not require the dielectric fluid 22. In a preferred embodiment, the dielectric fluid 22 comprises a standard μEDM dielectric fluid. Including, for example but not limited to, the fluids listed in Table 2.

TABLE 2

| Fluid Name | Viscosity | Dielectric Strength | Specific Gravity |
| --- | --- | --- | --- |
| EDM 30 | 3.4 cSt (centistrokes) | High | 0.82 |
| Ionoplus | 2.8 cSt | High | 0.793 |
| EDM 185 | 1.87 cSt | High | 0.788 |

However, the dielectric fluid 22 is not limited to the dielectric fluids listed in Table 2 and may comprises any fluid which allows for a dielectric breakdown to occur as the probe 14 is brought into close proximity with the work piece 100. In an alternative embodiment, the dielectric fluid 22 may comprise a gas including, for example, air and argon gas.

In an embodiment of the invention, the μEDM 16 further includes a platform 32 that allows for the position of the work piece 100 to be adjusted in at least two dimensions and preferably in three dimensions.

In operation, the control unit 12 with the controller 26 instructs the μEDM 16 and/or the cnc machine 34 to move the probe 14 in proximity to the work piece 100, as a gap between the work piece 100 and the probe 14 becomes sufficiently small a dielectric breakdown occurs. Upon detection of a current flux due to the dielectric breakdown the probe 14 is halted and coordinates of the probe 14 are recorded. The μEDM 16 then moves the probe 14 to another position in proximity to the work piece until another dielectric breakdown occurs and another position is recorded. This process is repeated until the work piece 100 is dimensioned, as needed. For example, when measuring relatively flat surfaces, the μEDM 16 moves the probe 14 ten microns in a vertical direction (z-axis) until a dielectric breakdown occurs and a position of the probe is recorded. The probe 14 is moved in the reverse vertical direction, then moved ten microns in a lateral direction (x-axis and/or y-axis) and the probe 14 is then lowered again until another dielectric breakdown occurs and the position of the probe is recorded again. The movement of the probe 14 in the x-axis, y-axis and z-axis may be varied as necessary depending on the material and the surface features of the work piece 100. In a preferred embodiment, a spark energy resulting from the dielectric breakdown does not cause damage to a surface of the work piece 100. In one embodiment, the spark energy resulting from the dielectric breakdown is less than 2.0 nanojoules. In another embodiment, the spark energy resulting from the dielectric breakdown is less than 0.500 nanojoules. In another embodiment, the spark energy resulting from the dielectric breakdown is less than 0.020 nanojoules.

The μEDM based metrology system 10 of this invention was tested using two types of sensor probes, four types of materials and at various energy levels to determine which variables have the most impact on surface deformation. The two types of probes tested included a cylindrical probe with a flat end and a cylindrical probe with a rounded conical tip probe. The four type of materials included stainless steel, molybdenum, gold and platinum. The testing was done with a focus on two fundamental aspects: repeatability and surface deformation. The testing was accomplished in an operating machine shop, using a standard μEDM dielectric fluid (EDM 30) and with no additional cleaning processes of either the sensor probes or the test materials.

Table 3 shows electrical variables and their level of impact on surface deformation.

TABLE 3

| Variable | Range | Impact | | |
|---|---|---|---|---|
| Energy | 5-20 V [10 pF] | High [0-5 V] | Low [5-20 V] | High [>20 V] |
| Polarity | Positive of Negative | | High | |
| Sensitivity | 10-90% rise time | Low [10-75%] | High [>75%] | |

The testing revealed that below 20V (10 pF), and above 5 volts (10 pF) the energy level had little impact on surface deformation. However, at higher voltages, greater than 20V, the chance of dielectric breakdown and stray discharges creating tell-tale EDM marks increases. Lower voltages, less than 5 V, were also less reliable as they were below the 5V supply of the sensing circuit reducing the sensing capability of this invention and possibility resulting in the probe contacting and marking the work piece.

The testing also revealed that the sensitivity of the discharge circuit was nearly inconsequential. If the sensitivity was set too high, greater than 75%, the system could be triggered by impurities in the flushing medium, the dielectric fluid.

The testing also revealed that a positive voltage polarity had a much more significant impact on surface deformation than did a negative voltage polarity. From this testing, it was determined that the optimal sensing voltages for most probes is between −5 and −20 volts with respect to the substrate.

Figure 51:
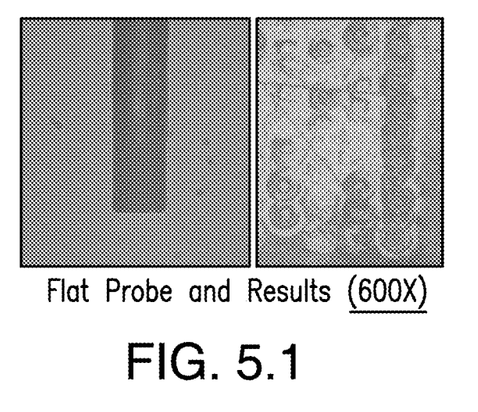
Figure 52:
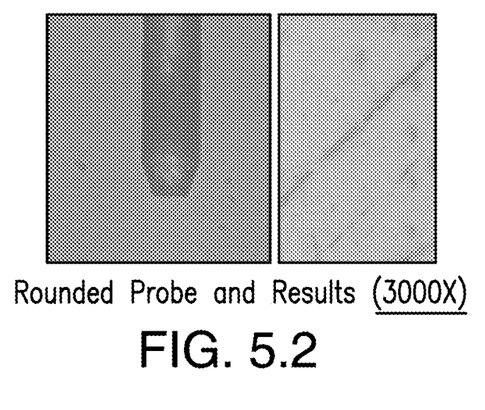

The testing was conducted with two types of probes a straight 90 degree cylinder and a rounded conical cylinder. It was determined that the shape of the probe has a great impact on the non-contact characteristic of the process of this invention. FIGS. 5.1 and 5.2 show each of the probes and the resulting surface deformation on Platinum. FIG. 5.1 shows the straight 90 degree cylinder probe and the resulting surface deformation of the Platinum at 600× zoom. FIG. 5.2 shows the rounded conical cylinder probe and the resulting surface deformation of the Platinum at 3000× zoom. These Figures shows how a flat surface probe was more prone to surface contact and grinding, while a rounded surface probe was more reliably non-contact. It was also determined that lower feed rates were necessary for flat sensors to achieve comparable results with more rounded sensors. The probes were both run at 5 mm/min.

Please note that the tested circuit utilized a 5V supply of the sensing circuit. However, the 5V supply of the sensing circuit need not be 5V and can be designed to operate at a higher or lower voltage which may change the electrical variables and their level of impact on surface deformation describe above.

Figure 6A:
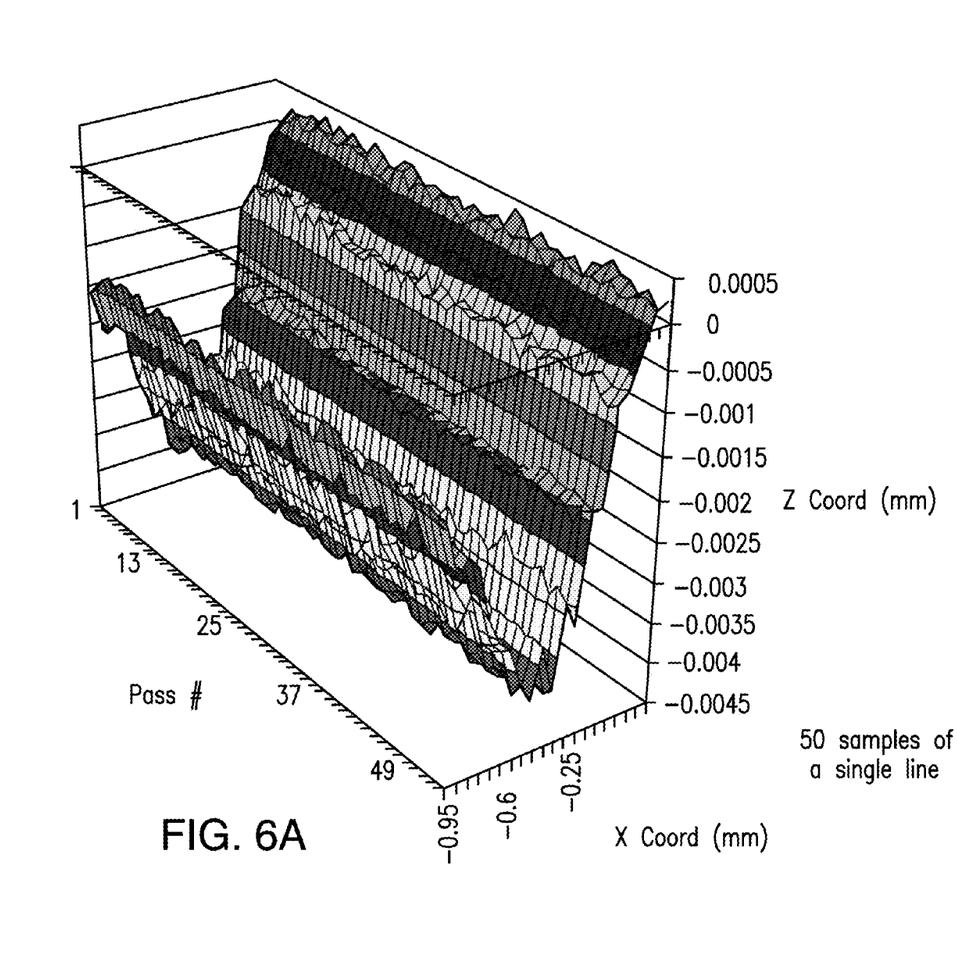
FIG. 6 shows a pair of graphs showing measurement repeatability of the micro-electrical discharge based metrology system of this invention.
Figure 6B:
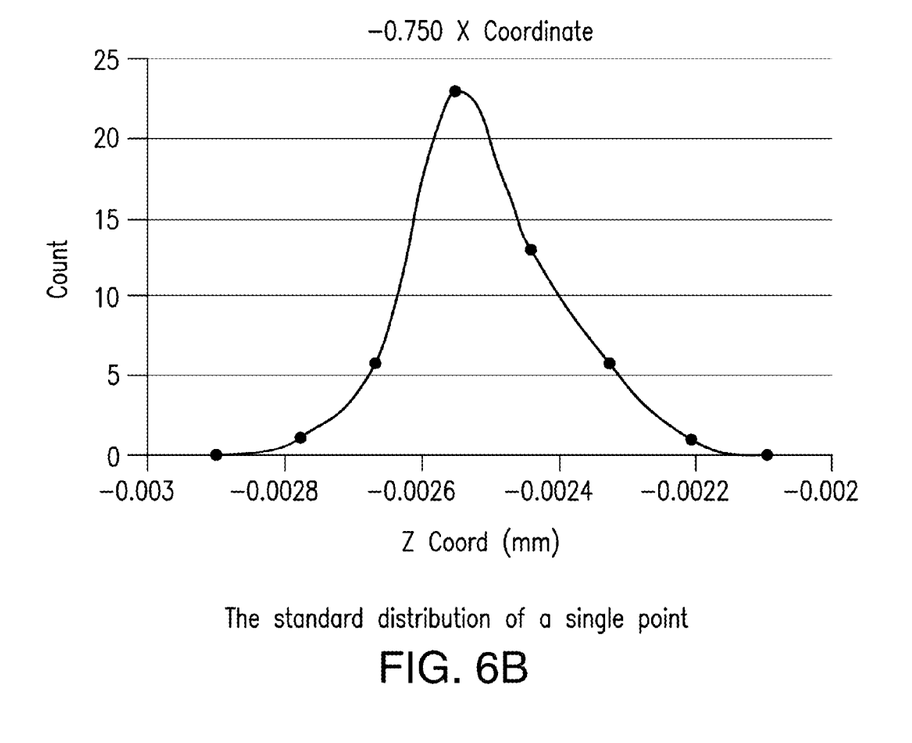

Repeatability is a key aspect of this invention as any surface erosion can alter future positioning. The non-destructive nature of this process minimizes errors that are caused by surface erosion. FIG. 6 shows a 50 sample segment of how the process repetitively measured a single line. The standard deviation of the line measurements was in the range of 100 nm, with a maximum of 150 nm and a minimum of 80 nm.

Figure 7A:
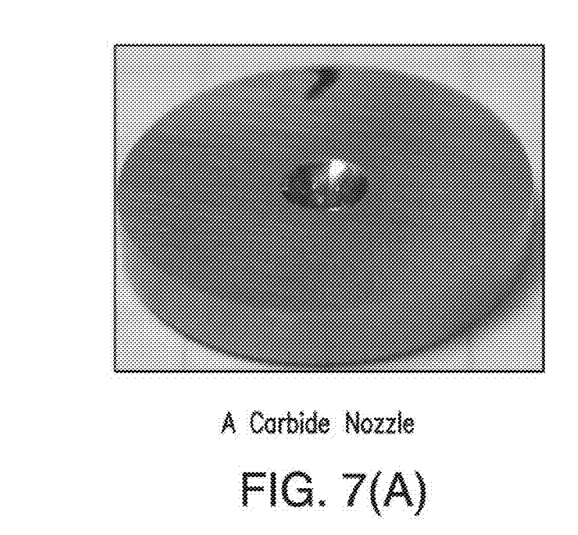
FIG. 7 shows a carbide nozzle and a 3-D mapping of the carbide nozzle.
Figure 7B:
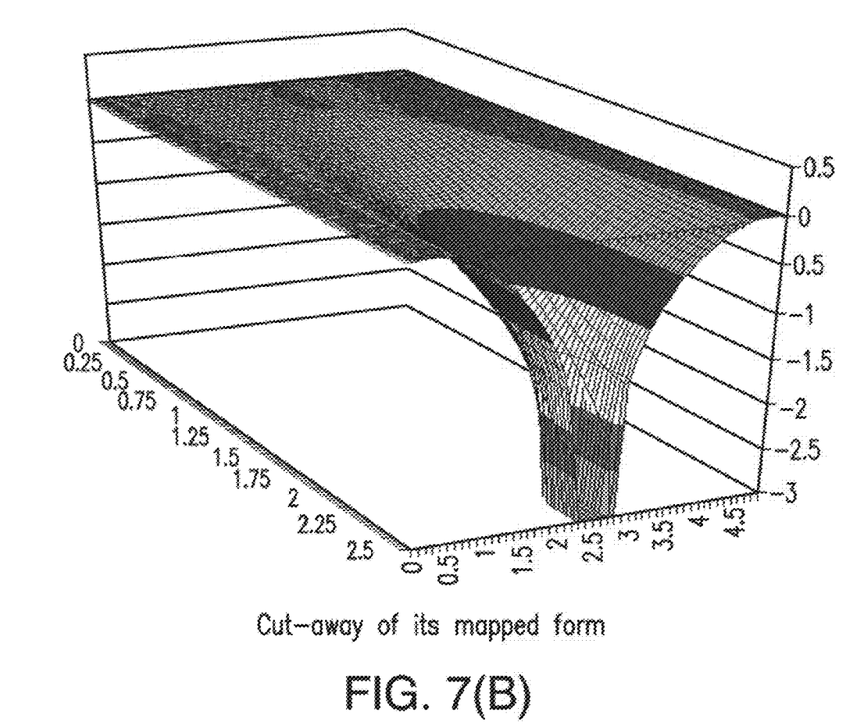
Figure 41:
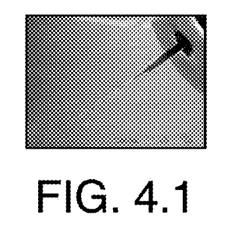
Figure 42:
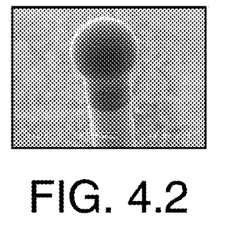
Figure 43:
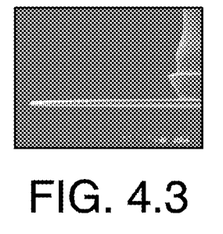
Figure 44:
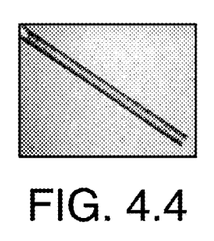
Figure 45:
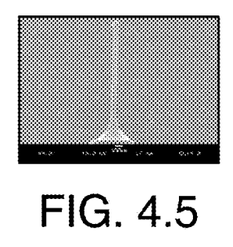
Figure 46:
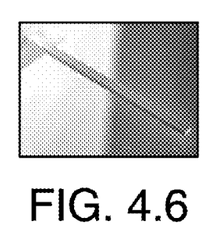
Figure 47:
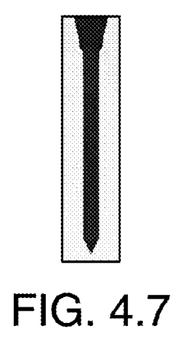

As a final test of the process, a work piece was measured and checked for imperfections. FIG. 7 shows a polished nozzle and a cut-away of its mapped form. The polished nozzle was measured using a brute force algorithm and then mapped separately. The mapping was prepared to expose any inconsistencies, or shelves, created by the conventional machining process. The result is the graph of a smooth form. The polished nozzle was later inspected (1000×) for 'witness' marks and none were found.

Thus, the testing shows that the μEDM-based metrology system of this invention can be an effective metrology tool. The prime variables affecting the process are voltage polarity, energy and probe shape. Other variables were found to be inconsequential except at the extremes, while others, with the optimization of electrode form, were shifted to benefit the process, such as feed rates and voltage potentials.

Thus, the invention provides a micro-electrical discharge machine based metrology system. The micro-electrical discharge machine based metrology system is a non-contact, non-destructive, and on-board metrology system capable of in-process quality assurance/quality control.

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. A system for non-contact metrology comprising:
a control unit including a sensing circuit and a controller;
a spindle probe in electrical connection with the sensing circuit;
a micro-electrical discharge machine in communication with the control unit, the micro-electrical discharge machine including a receiver to hold the spindle probe;
a mechanism in communication with the control or moving the spindle probe in at least two dimensions;
a work piece positioned on a work surface;
wherein the mechanism receives instructions from the controller to move the spindle probe from a distal position in relation to the work piece to a proximal position in relation to the work piece, thereby decreasing the magnitude of a gap defining the distance therebetween; and
wherein the sensing circuit receives instructions from the controller to apply a voltage to the spindle probe;
whereby movement of the spindle probe toward the proximal position reduces the magnitude of the gap sufficiently to permit the sensing circuit to detect a current flux;
whereby a position of the spindle probe is recorded as a function of the current flux; and
wherein the applied voltage is selected such that an energy resulting from the applied voltage does not cause damage to a surface of the work piece.

2. The system for non-contact metrology of claim 1, wherein the sensing circuit comprises a resistor-capacitor (RC) circuit and the sensing circuit runs on a natural frequency.

3. The system for non-contact metrology of claim 1, wherein the receiver comprises a spindle/collet system.

4. The system for non-contact metrology of claim 1, wherein the receiver comprises a double V-groove mandrel holder.

5. The system for non-contact metrology of claim 1, wherein the spindle probe comprises one of a cylindrical probe with a rounded conical tip, a traditional CMM stylus, a cylindrical stylus, an ultra-smooth stylus, a rectangular stylus, a wheel stylus and a tapered stylus.

6. The system for non-contact metrology of claim 1, wherein the work piece comprises a conductive material including one of stainless steel, platinum, titanium, gold and molybdenum.

7. The system for non-contact metrology of claim 1, wherein the energy resulting from the applied voltage is less than 2.0 nanojoules.

8. The system for non-contact metrology of claim 1, wherein the energy resulting from the applied voltage is less than 0.500 nanojoules.

9. The system for non-contact metrology of claim 1, wherein the energy resulting from the applied voltage is less than 0.020 nanojoules.

10. The system for non-contact metrology of claim 1, wherein the spindle probe is electrically isolated.

11. The system for non-contact metrology of claim 1, wherein the micro-electrical discharge machine is further capable of operating as a material erosion machine.

12. The system for non-contact metrology of claim 1, wherein the mechanism for moving the spindle probe in at least two dimensions comprises a computer numerical control machine.

13. A system for non-contact metrology comprising:
a control unit including a sensing circuit and a cnc controller;
a cnc machine in connection with the cnc controller, the cnc machine including a machining arm and a drive mechanism for moving the machining arm;
a spindle probe in electrical connection with the sensing circuit, the spindle probe mounted to the machining arm;
a work piece positioned on a work surface;
wherein the control unit controls the drive mechanism to move the machining arm and the spindle probe from a distal position in relation to the work piece to a proximal position in relation to the work piece, thereby decreasing the magnitude of a gap defining the distance between the work piece and the spindle probe; and wherein the sensing circuit receives instructions from the control unit to apply a voltage to the spindle probe;
whereby movement of the spindle probe toward the proximal position reduces the magnitude of the gap sufficiently to permit the sensing circuit to detect a current flux;
whereby a position of the spindle probe is recorded as a function of the current flux; and
wherein the applied voltage is selected such that an energy resulting from the applied voltage does not cause damage to a surface of the work piece.

14. The system for non-contact metrology of claim 13, wherein the sensing circuit comprises a resistor-capacitor (RC) circuit.

15. The system for non-contact metrology of claim 13, wherein the sensing circuit comprises a pulsed direct current (DC) generator with a frequency selected by a waveform generator.

16. The system for non-contact metrology of claim 13, wherein the spindle probe comprises one of a cylindrical probe with a rounded conical tip, a traditional CMM stylus, a cylindrical stylus, an ultra-smooth stylus, a rectangular stylus, a wheel stylus and a tapered stylus.

17. The system for non-contact metrology of claim 13, wherein the energy resulting from the applied voltage is less than 2.0 nanojoules.

18. The system for non-contact metrology of claim 13, wherein the spindle probe is electrically isolated.

19. The system for non-contact metrology of claim 13, wherein the cnc machine is further capable of operating as a material erosion machine.

20. A method of operating a micro-electrical discharge machine as a non-contact metrology machine comprising:
connecting a control unit to the micro-electrical discharge machine, wherein the control unit includes a sensing circuit and a spindle probe in electrical connection with the sensing circuit;
operating the micro-electrical discharge machine to move the spindle probe from a distal position in relation to a work piece to be measured to a proximal position in relation to the work piece, thereby decreasing the magnitude of a gap defining the distance therebetween; and to apply a voltage to the spindle probe wherein the applied voltage is selected such that an energy resulting from the applied voltage does not cause damage to a surface of the work piece;
whereby the sensing circuit senses a current flux as the magnitude of the gap between the work piece and the spindle probe becomes sufficiently small; and
recording a position of the spindle probe as a function of the current flux.

* * * * *